(12) United States Patent
Furuya et al.

(10) Patent No.: US 6,714,125 B2
(45) Date of Patent: Mar. 30, 2004

(54) VEHICLE-APPLIED DISPLAY UNIT

(75) Inventors: Yoshiyuki Furuya, Shizuoka (JP); Takeyuki Amari, Shizuoka (JP); Tetsuya Sugiyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/000,134

(22) Filed: Dec. 4, 2001

(65) Prior Publication Data

US 2002/0097196 A1 Jul. 25, 2002

(30) Foreign Application Priority Data

Jan. 19, 2001 (JP) ...................................... 2001-012456
Jan. 19, 2001 (JP) ...................................... 2001-012457

(51) Int. Cl.$^7$ ................................................ B60Q 1/00
(52) U.S. Cl. ........................ 340/438; 340/980; 359/13
(58) Field of Search ................................ 340/459, 461, 340/438, 980, 995.1, 815.47, 815.74; 359/13, 630; 349/11, 65; 345/7, 8, 9

(56) References Cited

U.S. PATENT DOCUMENTS

| 5,013,135 A | | 5/1991 | Yamamura ................... 340/980 |
| 5,243,448 A | * | 9/1993 | Banbury ....................... 359/13 |
| 5,394,203 A | | 2/1995 | Murphy et al. ............... 353/13 |
| 5,422,812 A | * | 6/1995 | Knoll et al. .................. 340/995 |
| 5,497,170 A | * | 3/1996 | Kato et al. ................... 340/980 |
| 5,502,456 A | * | 3/1996 | Korenaga et al. ............ 359/630 |

FOREIGN PATENT DOCUMENTS

| EP | 0 679 549 A1 | 11/1995 |
| GB | 2 149 140 A | 6/1985 |
| GB | 2 246 900 A | 2/1992 |
| JP | 62-275845 | 11/1987 |
| JP | 4-85370 | 7/1992 |
| JP | 11-91403 | 4/1999 |
| JP | 110091403 A | 6/1999 |

\* cited by examiner

Primary Examiner—Van Trieu
(74) Attorney, Agent, or Firm—Armstrong, Kratz, Quintos, Hanson & Brooks, LLP

(57) ABSTRACT

A vehicle-applied display unit is provided, wherein the image light of an inverted display image emitted from a display device in a dashboard and passed an opening of the dashboard is reflected toward an eye point I by means of a combiner standing from a recess of the dashboard positioned ahead of the eye point I. The combiner is arranged outside the forward sight from the eye point I and on an optical path of a portion, of outer light entering a vehicle-inside from a vehicle-outside, going toward the display device through the opening at least over a whole extent, in a vehicle-width direction, of the portion of the outer light for at least partially enclosing the opening over a front through both sides portions thereof, and a polarizing plate is coated on an inner surface of the combiner.

12 Claims, 3 Drawing Sheets

VEHICLE-APPLIED DISPLAY UNIT

BACKGROUND OF THE INVENTION

1. Field of the Invention

The present invention relates to a vehicle-applied display unit to visualize an display image of a luminous display source as a virtual image on a combiner standing on a dashboard.

2. Description of the Related Art

In a vehicle-applied display unit to visualize, or to have a driver recognize, a virtual image of a display image including supporting information about travelling by means of reflection for leading an image light of the display image of a luminous display source accommodated in a dashboard to an eye point of a driver, an opening for leading the image light of the display image of the luminous display source to a front windshield or a combiner which reflects the image light is usually formed on a top face of the dashboard.

An outer light entering a vehicle-inside from an vehicle-outside further enters the opening and is irradiated to the luminous display source. Therefore, measures for preventing a washout (i.e., weakening of contrast) of the virtual image of the display image are necessary.

For example, Japanese Utility Model Application Laid-open No. 4-85370 discloses a prior art vehicle-applied display unit with one measure, wherein two polarizing plates having respective polarization directions different by 90 degrees each other are placed on an inner surface portion of a front windshield to which the image light of the display image passing the opening of the dashboard is irradiated. The two polarizing plates intercept the outer light irradiated to the luminous display source.

With respect to the above prior art disclosed in Japanese Utility Model Application Laid-open No. 4-85370, however, since because the outer light enters a vehicle with various angles from various portions such as the front windshield and door windshields, the outer light entering the vehicle-inside from the portions without the polarizing plate cannot be prevented from reaching the luminous display source.

An object of the present invention is to provide a vehicle-applied display unit, wherein the contrast of a virtual image, visible from an eye point, of a display image of a luminous display source is prevented from lowering by the influence of the outer light entering the vehicle-inside from the vehicle-outside or the lowering of the contrast is reduced so as to keep the visibility of the virtual image of the display image of the luminous display source well.

SUMMARY OF THE INVENTION

In order to achieve the above object, as a first aspect of the present invention, a vehicle-applied display unit comprises: a dashboard of a vehicle positioned ahead of an eye point in the vehicle; a luminous display source provided inside the dashboard; an opening provided on the dashboard; and a combiner standing on the dashboard visibly from the eye point and reflecting image light, toward the eye point, of a display image emitted from the luminous display source and passed the opening, wherein the combiner is arranged on an optical path of a portion, of outer light entering a vehicle-inside from a vehicle-outside, going toward the luminous display source through the opening at least over a whole extent, in a vehicle-width direction, of the portion of the outer light for at least partially enclosing the opening over a front through both sides portions thereof and is made of light-attenuation processed material capable of at least attenuating the portion of the outer light.

As a second aspect of the present invention, based on the first aspect, the combiner is arcuately formed in a vehicle-width direction with an inside surface of the combiner facing the eye point in such a manner that both longitudinal ends of at least a portion, of the combiner, on which the image light of the display image is irradiated are positioned rearward of a central portion thereof and also in such a manner that, in a vehicle-height direction, the portion of the combiner has a straight cross-section while inclinedly standing rearward with a top thereof being positioned rearward of a bottom thereof.

As a third aspect of the present invention, based on the first aspect, a measuring instrument displaying a state of the vehicle is arranged on a portion, of the dashboard, located nearer the eye point than the opening is, and the combiner has such an external form that a contour of the combiner visible from the eye point almost encloses a virtual image of the display image and a real image of the measuring instrument, the virtual image being obtained by irradiation of the image light of the display image and being visible from the eye point.

As a fourth aspect of the present invention, based on the third aspect, the measuring instrument includes a plurality of meter units with intervals in the vehicle-width direction and the combiner is arranged in a manner that a portion of the combiner reflects the image light of the display image of the luminous display source toward the eye point, the portion being positioned between two meter units adjacent to each other.

As a fifth aspect of the present invention, based on the first aspect, a recess is formed on a top face of the dashboard, and the combiner stands inside the recess while partially enclosing the opening formed in the recess so that the combiner is positioned outside a vehicle forward sight from the eye point.

As a sixth aspect of the present invention, based on the first aspect, a steering wheel is arranged between the dashboard and the eye point, and the combiner has a regular-arcuated top edge, a curvature of the top edge being different from that of the steering wheel according to a back-and-forth position difference therebetween from the eye point.

As a seventh aspect of the present invention, based on the first aspect, an optical path changing member to make the optical path of some area, in a vehicle-height direction, of the portion of the outer light go away from the luminous display source is arranged between the luminous display source and the combiner, and the combiner is arranged on the optical path of at least a remaining area of the portion of the outer light.

As an eighth aspect of the present invention, based on any one of the first to seventh aspects, a polarizing plate is put on one surface of the combiner for attaining light attenuation, and a second polarizing plate having a polarization direction different from that of the polarizing plate by 90 degrees is arranged between the opening and the luminous display sources.

As a ninth aspect of the present invention, based on the eighth aspect, the luminous display source has a third polarizing plate having a same polarization direction as that of the second polarizing plate on an emitting surface of the image light of the display image.

As a tenth aspect of the present invention, a vehicle-applied display unit comprises: a dashboard of a vehicle positioned ahead of an eye point in the vehicle; a luminous display source provided inside the dashboard; an opening provided on the dashboard; and a combiner standing on the dashboard visibly from the eye point and reflecting image light, toward the eye point, of a display image emitted from the luminous display source and passed the opening, wherein a recess is formed on a top face of the dashboard, and the combiner stands inside the recess and ahead of the opening formed in the recess so that the combiner is positioned outside a vehicle forward sight from the eye point.

As an eleventh aspect of the present invention, based on the tenth aspect, a measuring instrument displaying a state of the vehicle is arranged on a portion, of the dashboard, located nearer the eye point than the opening is, and the combiner has such an external form that a contour of the combiner visible from the eye point almost encloses a virtual image of the display image and a real image of the measuring instrument, the virtual image being obtained by irradiation of the image light of the display image and being visible from the eye point.

As a twelfth aspect of the present invention, based on the eleventh aspect, the measuring instrument includes a plurality of meter units with intervals in the vehicle-width direction and the combiner is arranged in a manner that a portion of the combiner reflects the image light of the display image of the luminous display source toward the eye point, the portion being positioned between two meter units adjacent to each other.

As a thirteenth aspect of the present invention, based on any one of the tenth to twelfth aspects, a steering wheel is arranged between the dashboard and the eye point, and the combiner has a regular-arcuated top edge, a curvature of the top edge being different from that of the steering wheel according to a back-and-forth position difference therebetween from the eye point.

According to the first aspect of the present invention, the opening to make the image light of the display image of the luminous display source in the dashboard pass therethrough is provided, and the combiner being a light-attenuation treated member partially encloses the opening over the front through both sides portions thereof. Therefore, a portion, going toward the luminous display source, of the outer light entering the vehicle-inside from the vehicle-outside is attenuated at least over the whole extent in the vehicle-width direction.

According to the second aspect of the present invention, because the combiner partially enclosing the opening over the front through both sides portions thereof has the straight section in the vehicle-height direction, the virtual image of the display image on the combiner visible from the eye point is not distorted in the vehicle-height direction.

According to the third aspect of the present invention, because the combiner has such an external form that a contour of the combiner visible from the eye point almost encloses a virtual image of the display image and a real image of the measuring instrument, which virtual image is obtained by irradiation of the image light of the display image and being visible from the eye point, the virtual image of the display image and the real image of the measuring instrument are visible as one combination display of a single measuring instrument unit from the eye point.

According to the fourth aspect of the present invention, because the combiner is arranged in a manner that a portion of the combiner reflects the image light of the display image of the luminous display source toward the eye point, which portion is positioned between two meter units adjacent to each other, the virtual image of the display image on the combiner visible from the eye point and the real image of the measuring instrument are arranged in the vehicle-width direction.

According to the fifth aspect of the present invention, because the opening on the dashboard is formed inside the recess formed on the top face of the dashboard and the combiner visible from the eye point stands inside the recess while partially enclosing the opening, the combiner can be positioned outside the vehicle forward sight from the eye point by adjusting the height of the combiner and the depth of the recess.

According to the sixth aspect of the present invention, the contour of the combiner is hidden by the steering wheel invisibly from the eye point.

According to the seventh aspect of the present invention, the optical path changing member to make the optical path of some area, in a vehicle-height direction, of the portion of the outer light go away from the luminous display source is arranged between the luminous display source and the combiner and the combiner is arranged on the optical path of at least a remaining area of the portion of the outer light, the whole portion of the outer light passing the opening of the dashboard toward the luminous display source can be attenuated.

According to the eighth aspect of the present invention, the outer light component having passed the polarizing plate put on the one surface of the combiner is intercepted by the second polarizing plate on the way to the luminous display source from the opening on the dashboard.

According to the ninth aspect of the present invention, the image light of the display image polarized by the third polarizing plate provided on the luminous display source can pass the second polarizing plate having the same polarization direction as that of the third polarizing plate and arranged on the way to the opening from the luminous display source. The image light of the display image polarized by the third polarizing plate, however, cannot pass the polarizing plate having a different polarization direction as that of the third or second polarizing plate by 90 degrees and therefore is reflected toward the eye point.

According to the tenth aspect of the present invention, the opening to pass the image light of the display image emitted from the luminous display source in the dashboard toward the combiner is formed in the recess formed on the top face of the dashboard. And, because the combiner visible from the eye point stands inside the recess and ahead of the opening, some inner surface of the recess is positioned behind the combiner when viewed from the eye point, whereby the sight through the combiner from the eye point is the inner surface of the recess even if the combiner is formed of a transparent member.

According to the eleventh aspect of the present invention, because the combiner has such an external form that a contour of the combiner visible from the eye point almost encloses a virtual image of the display image and a real image of the measuring instrument, which virtual image is obtained by irradiation of the image light of the display image and being visible from the eye point, the virtual image of the display image and the real image of the measuring instrument are visible as one combination display of a single measuring instrument unit from the eye point.

According to the twelfth aspect of the present invention, because the combiner is arranged in a manner that a portion of the combiner reflects the image light of the display image of the luminous display source toward the eye point, which portion is positioned between two meter units adjacent to each other, the virtual image of the display image on the combiner visible from the eye point and the real image of the measuring instrument are arranged in the vehicle-width direction.

According to the thirteenth aspect of the present invention, the contour of the combiner is hidden by the steering wheel invisibly from the eye point.

According to the above-described structures of the present invention, the following advantages are provided.

(1) The portion of the outer light entering the vehicle-inside from the vehicle-outside passing the opening of the dashboard toward the luminous display source is attenuated at least over the whole extent in the vehicle-width direction by passing the combiner so that the lowering of the contrast of the virtual image, of the display image of the luminous display source, visible from the eye point can be reduced or prevented. Thereby the visibility of the virtual image of the display image of the luminous display source can be better.

(2) The combiner is arranged to partially enclose the opening making the image light of the display image of the luminous display source in the dashboard pass therethrough, while not distorting the virtual image of the display image on the combiner in the vehicle-height direction, which virtual image is visible from the eye point by means of the irradiation of the image light of the display image from the luminous display source. Like this, the combiner can easily prevent the virtual image of the display image on the combiner from being distorted in the vehicle-height direction.

(3) The virtual image of the display image of the luminous display source and the real image of the measuring instrument are visible as one combination display of a single measuring instrument unit from the eye point by means of the contour of the combiner. Like this, the combiner can attain the visual unification of the virtual image of the display image of the luminous display source and the real image of the measuring instrument, while reducing the sense of visual incongruity.

(4) The virtual image of the display image on the combiner and the real image of the measuring instrument are arranged in the vehicle-width direction outside the forward sight of the vehicle from the eye point. Therefore, the forward sight of the vehicle especially in the vehicle-height direction can be wider than that of a case that the area of the virtual image is arranged over or under the measuring instrument.

(5) The combiner has a height according to the depth of the recess so that the combiner can be outside the forward sight of the vehicle from the eye point. Therefore, even if the combiner is formed of a translucent or a non-transparent member, the combiner does not narrow down the forward sight.

(6) The contour (i.e., the top edge portion) of the combiner is hidden by the steering wheel so that the portion is invisible from the eye point, thereby reducing the visual sense of incongruity.

(7) The whole outer light passing through the opening of the dashboard toward the luminous display source is attenuated by means of the combined actions of the combiner and the optical path changing member so that the lowering of the contrast of the virtual image, visible from the eye point, of the display image of the luminous display source can be reduced or prevented by the influence of the outer light entering the vehicle-inside from the vehicle-outside toward the luminous display source, thereby further improving the visibility of the virtual image of the display image of the luminous display source.

(8) The outer light component having passed the polarizing plate put on the one surface of the combiner is intercepted by the second polarizing plate on the way to the luminous display source from the opening on the dashboard so that the lowering of the contrast of the virtual image, visible from the eye point, of the display image of the luminous display source can be reduced or prevented by the influence of the outer light entering the vehicle-inside from the vehicle-outside toward the luminous display source, thereby further improving the visibility of the virtual image of the display image of the luminous display source.

(9) The image light of the display image reached the combiner from the luminous display source through the opening on the dashboard does not reach the front windshield so that the virtual image of the display image on the combiner is not disturbed by the virtual image (i.e., ghost image) of the display image on the front windshield, thereby further improving the visibility of the virtual image of the display image of the luminous display source.

(10) Even if the combiner is transparent, the sight from the eye point is obstructed by the inner surface of the recess so that the virtual image of the display image on the combiner is visible from the eye point with a contrast difference from the inner surfaces of the recess, whereby the lowering of the contrast of the virtual image of the display image visible on the combiner caused by the outer light entering the vehicle-inside from the vehicle-outside is prevented, thereby obtaining good visibility of the virtual image of the display image on the combiner.

(11) The virtual image of the display image of the luminous display source and the real image of the measuring instrument are visible as one combination display of a single measuring instrument unit from the eye point by means of the contour of the combiner. Thus, the combiner can attain the visual unification of the virtual image of the display image of the luminous display source and the real image of the measuring instrument, while reducing the sense of visual incongruity.

(12) The virtual image of the display image on the combiner and the real image of the measuring instrument are arranged in the vehicle-width direction outside the forward sight of the vehicle from the eye point. Therefore, the forward sight of the vehicle especially in the vehicle-height direction can be wider than that of a case that the area of the virtual image is arranged over or under the measuring instrument.

(13) The contour (i.e. the top edge portion) of the combiner is hidden by the steering wheel so that the portion is invisible from the eye point, thereby reducing the visual sense of incongruity.

The above and other objects and features of the present invention will become more apparent from the following description taken in conjunction with the accompanying drawings.

DESCRIPTION OF THE PREFERRED EMBODIMENT(S)

Embodiment(s) of the present invention will now be described in further detail with reference to the accompanying drawings.

Figure 1:
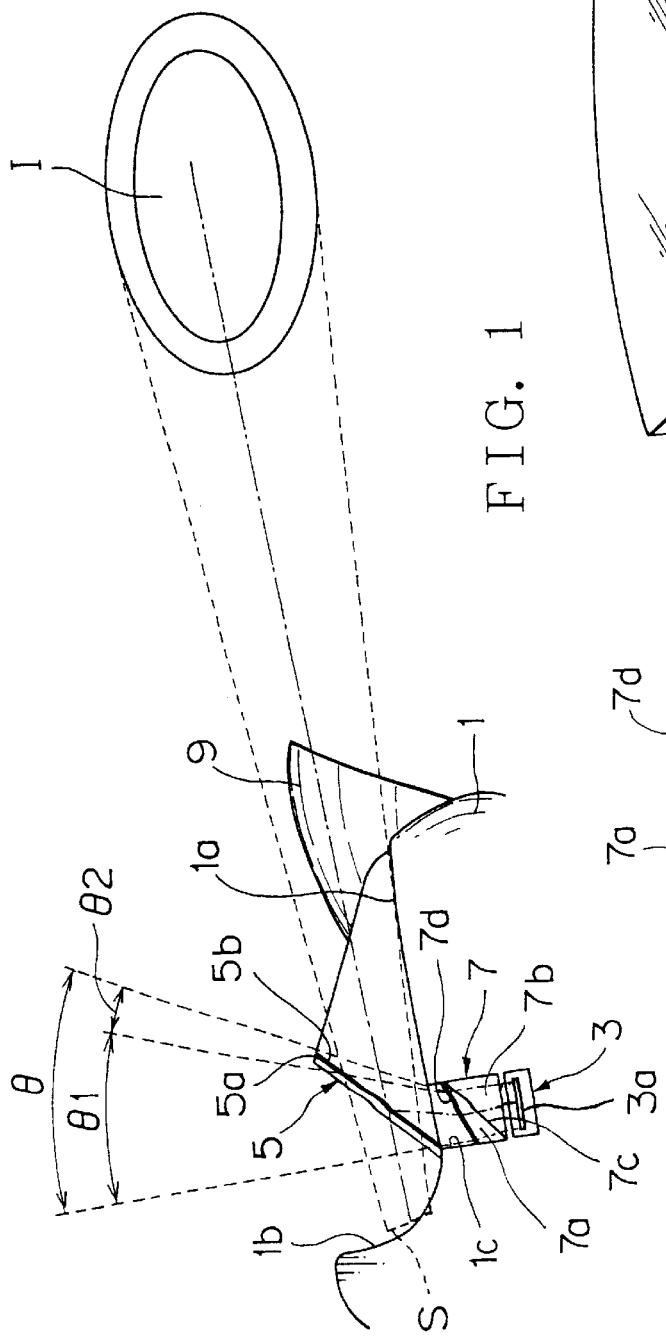
FIG. 1 is a schematic illustration showing an embodiment of the inventive vehicle-applied display unit.

FIG. 1 is a schematic illustration showing an embodiment of the inventive vehicle-applied display unit, wherein the vehicle-applied display unit of the present embodiment has a display device 3 accommodated inside a dashboard 1 of a vehicle, a combiner 5 arranged on the dashboard 1 so as to reflect the image light of a display image of the display device 3 toward an eye point I of the driver, an optical path changing member 7 accommodated inside the dashboard 1 between the display device 3 and the combiner 5, and an analog meter unit 9 arranged on the dashboard 1 and located nearer the eye point I than the combiner 5 is.

The above dashboard 1 is colored dark for preventing a non-illustrated front windshield from reflecting the dashboard 1.

Figure 2:
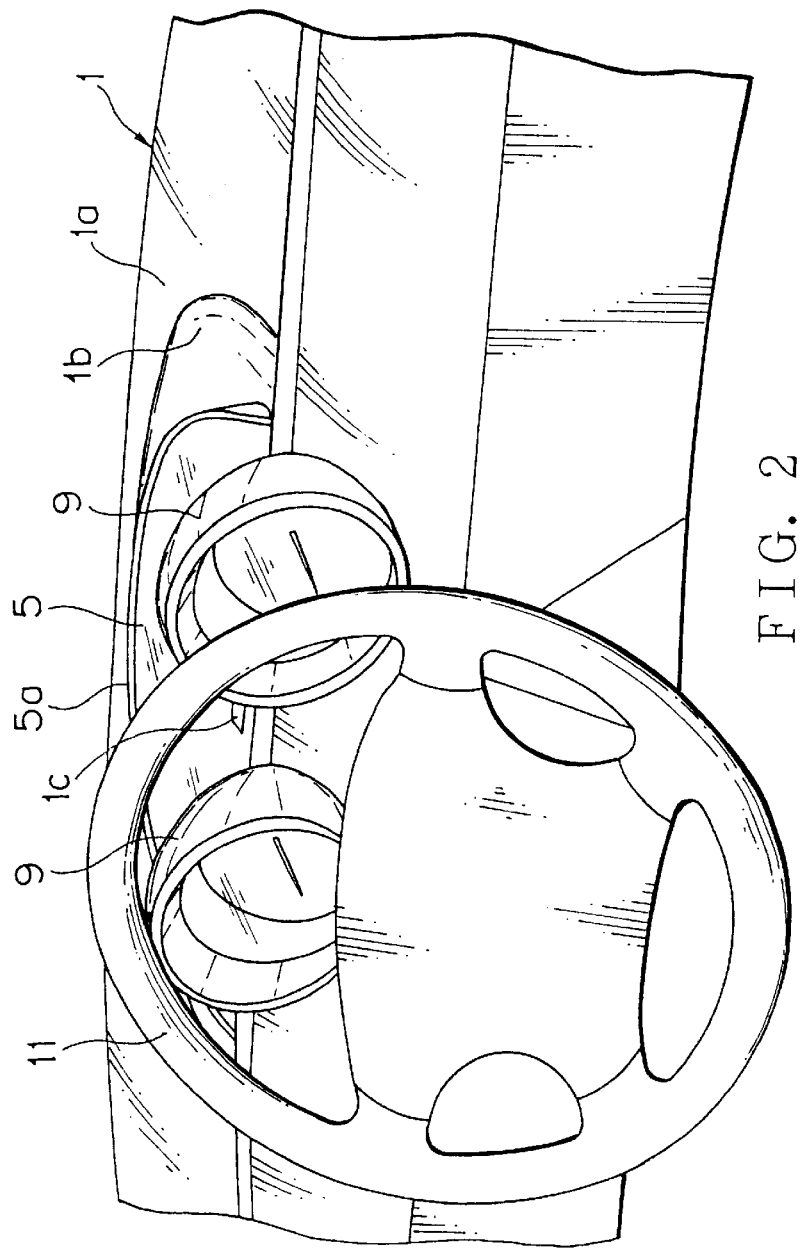
FIG. 2 is an enlarged perspective view of the vehicle-applied display unit of FIG. 1.

Two analog meter units 9 (measuring instrument) with an interval therebetween in a vehicle-width direction are provided as shown in FIG. 2. A semi-circular recess 1b is formed on a top face 1a of the dashboard 1, while partially surrounding the analog meter units 9.

An opening 1c to pass the image light emitted from the above display device 3 therethrough is formed between the two analog meter units 9 in the vehicle-width direction. The opening 1c is positioned ahead of the two analog meter units 9 and in the recess 1b in a vehicle-length direction.

The above display device 3 (luminous display source) is a liquid crystal display with a backlight in the present embodiment, and, as shown in FIG. 1, a display surface facing upward in the vehicle-width direction is provided on the display device 3 by using a polarizing plate 3a (third polarizing plate) with a polarization direction of the vehicle-width direction.

On the display device 3 an inverted display image (display image) is luminously-displayed. In the inverted display image, an image about auxiliary information such as a driving direction information and a travelling speed, of a navigation system, necessary for the drive is inverted front and back by the inner liquid crystal cell such that the top side of a normal image is positioned at a vehicle-rear side of the display device 3 and the bottom side of the normal image is positioned at a vehicle-front side of the display device 3. The image light of this inverted display image is polarized by the polarizing plate 3a in the vehicle-width direction and emitted therefrom.

The image light of the inverted display image displayed on the above display device 3 penetrates the above optical path changing member 7, passes the above opening 1c of the dashboard 1, and is irradiated to the above combiner 5 on the dashboard 1. By this irradiation, the virtual image S, of the normal image, obtained by inverting front-and-back and up-and-down the inverted display image displayed on the display device 3 is visible from the eye point I.

The above combiner 5 is formed by regular-arcuately curving a smoke-processed dark resin plate in its longitudinal direction. The resin plate is a laterally long one with gradually narrowed longitudinal ends. As shown in FIG. 2, the above combiner 5 is arranged almost in parallel, i.e., almost concentrically, with the front periphery of the recess 1b of the dashboard 1 in such a manner that the both longitudinal ends of the combiner 5 are positioned rearward of the central portion thereof. That is, the inside surface of the arcuated combiner 5 faces the eye point I. Similarly, both ends of a portion of the combiner, on which the image light of the display image is irradiated are positioned rearward of the central portion thereof. Here, the front, or the rear or back, means that of the vehicle. And, as shown in FIG. 1, the above combiner 5 inclinedly stands rearward on, i.e., inside, the recess 1b.

The combiner 5 is arranged on the optical path of a portion of the outer light, going toward the display device 3 through the opening 1c of the dashboard 1, which outer light enters the vehicle-inside from the vehicle-outside. The combiner 5 is provided at least over the whole extent, in the vehicle-width direction, of the above portion of the outer light such that the combiner 5 partially encloses the opening 1c over the front through both sides portions thereof. The combiner 5 can partially enclose two analog meter units 9 therein.

When the outer light going toward the display device 3 through the opening 1c of the dashboard 1 has a full angular range θ shown in FIG. 1, the combiner 5 has a width, in the vehicle-longitudinal direction, capable of covering an angular range θ 1.

As shown in FIG. 2, the longitudinal, i.e., vehicle-lateral, center of the combiner 5 is positioned ahead of the opening 1c of the dashboard 1.

Figure 3:
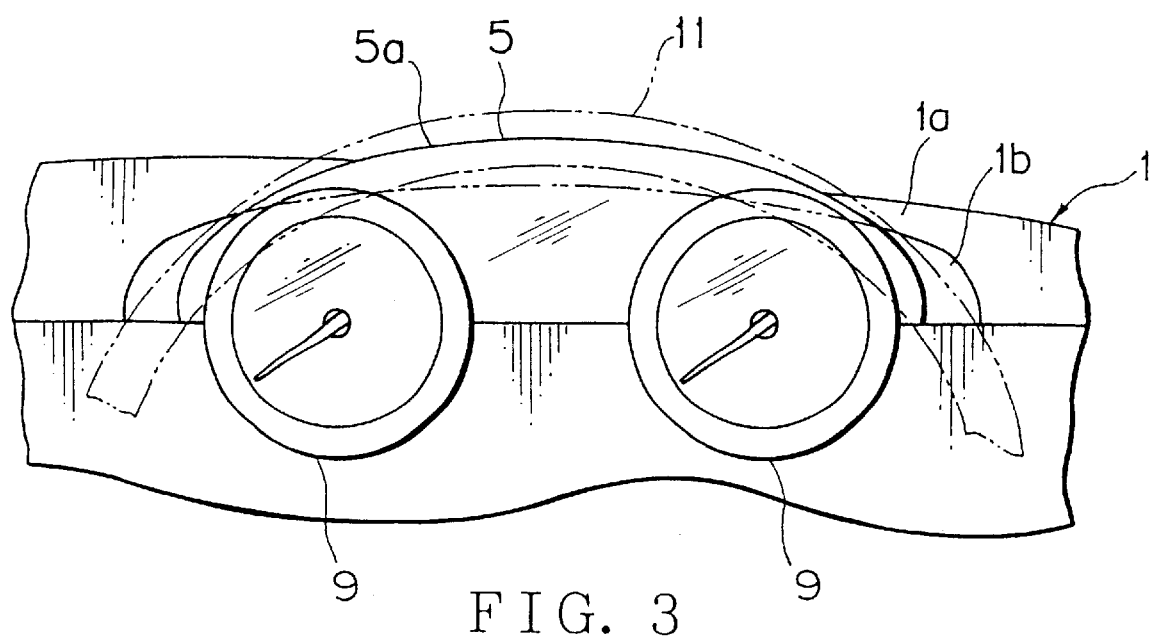
FIG. 3 is a front view of the vehicle-applied display unit of FIG. 1.

As shown in FIG. 3, a central portion of a top edge 5a of the combiner 5 is hidden with a steering wheel 11 arranged between the combiner 5 and the eye point I. The combiner 5 has such a regular-arcuated external form (contour) that the combiner 5 does not protrude over the steering wheel 11 in the forward sight visible from the eye point I.

As shown in FIG. 1, a polarizing plate 5b is coated on an inner surface, i.e., an eye point side surface, of the combiner 5. The polarizing plate 5b has a polarization direction in the vehicle-height direction, which polarization direction is different from that of the polarizing plate 3a of the display device 3 by 90 degrees. With both of the polarization by the polarizing plate 5b and the smoke-treatment made on the combiner 5 itself, the combiner 5 attenuates the light passing itself through.

In the combiner 5 with the above structure, an area, visible from the eye point I, of the virtual image S being the normal image by means of irradiating the image light of the inverted display image from the display device 3 is the central portion of the combiner 5 in the vehicle-width direction, which central portion is directly visible from the eye point I through the interval of the two analog meter units 9.

Because the above combiner 5 is regular-arcuated in the vehicle-width direction and is so inclinedly arranged that the top edge 5a side is nearer the eye point I than the bottom side is, the optical path, of the inverted display image, from the display device 3 to the eye point I through the top edge 5a side of the combiner 5 is longer than that through the bottom side of the combiner 5. Also, the optical path, of the inverted display image, from the display device 3 to the eye point I through the central portion of the combiner 5 is longer than those through the side portions of the combiner 5.

Figure 5:
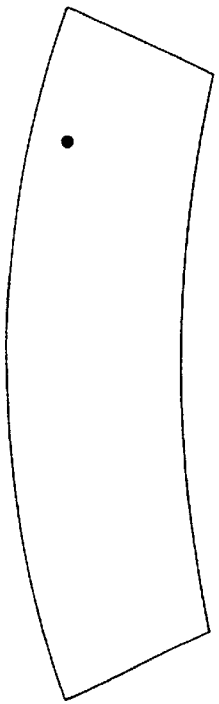
FIG. 5 is an explanatory illustration of a distortional action given to the image by the combiner of FIG. 1.
Figure 4:
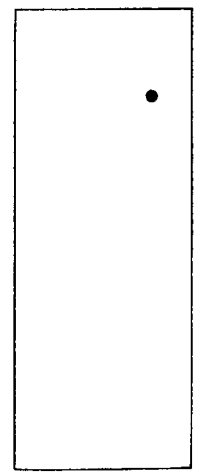
FIG. 4 is an explanatory illustration showing an example of an inverted display image to be displayed on the display device of FIG. 1.

Accordingly, if a laterally-long rectangular inverted display image shown in FIG. 4 is displayed on the display device 3 in the vehicle-width direction and irradiated directly to the longitudinal-central portion of the combiner 5 without passing through the optical path changing member 7, the form of the virtual image, visible from the eye point I, of the normal image obtained by inverting front-and-back and up-and-down the inverted display image becomes substantially a sector shown in FIG. 5.

The combiner 5 is curved regular-arcuately in the vehicle-width direction, so the inverted display image is enlarged in the vehicle-width direction by the reflection on the combiner 5 while turning to the normal image.

Figure 7:
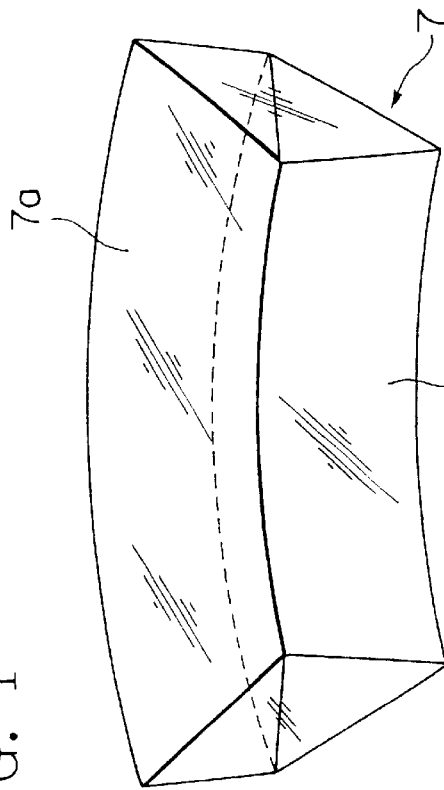
FIG. 7 is a perspective view of the optical path changing member of FIG. 1.
Figure 6:
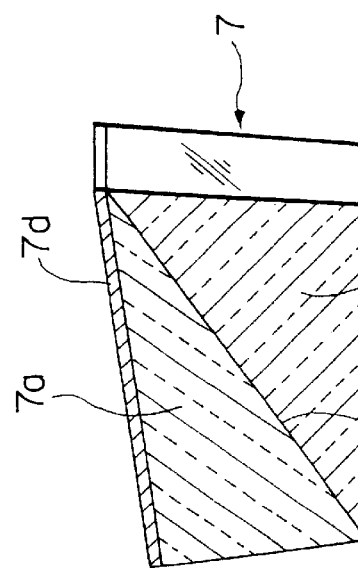
FIG. 6 is a sectional view of the optical path changing member of FIG. 1.

The above optical path changing member 7 is, as shown in FIG. 6, formed by laying two prisms 7a, 7b, each having a triangular section and having respective refractive indexes. Therefore, the above optical path changing member 7 has a boundary surface 7c in its interior and a generally trapezoidal cross-sections as shown in FIG. 7. The entire optical path changing member 7 curves in a sector-shape.

The optical path changing member 7 is arranged with its short radius side curved surface facing the rear side of the vehicle and with its long radius side curved surface facing the front side of the vehicles as shown in FIG. 1. The upper side of the optical path changing member 7 faces the opening 1c of the dashboard 1, and the bottom of the optical path changing member 7 faces the polarizing plate 3a of the display device 3.

Figure 8:
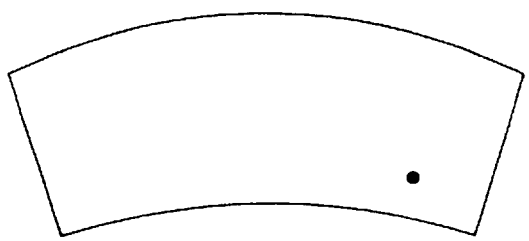
FIG. 8 is an explanatory illustration of a distortional action given to the image by the optical path changing member of FIG. 1.

Accordingly, when the oblong rectangular inverted display image shown in FIG. 4 is displayed on the display device 3 and the image light of the inverted display image enters one surface of the optical path changing member 7, the image emitted from the other surface, facing the opening 1c of the dashboard 1, of the optical path changing member 7 is substantially in a sector having a shorter circular arc at the rear side of the vehicle as shown in FIG. 8.

The optical path changing member 7 (without a later-described polarizing plate 7d) transmits the outer light component of the angular range θ 1 (the remaining range wherein the optical path of the outer light is not so changed as to go away from the luminous display source by the optical path changing member) up to the polarizing plate 3a of the display device 3, while refracting the outer light component according to the difference of the refractive indexes among the prisms 7a, 7b and the air. The outer light component within the angular range θ 1 is a portion of the outer light with the angular range θ shown in FIG. 1, which outer light enters the vehicle-inside from the vehicle-outside and passes the combiner 5 and the opening 1c of the dashboard 1.

On the other hand, the upper-located prism 7a of the optical path changing member 7 transmits the remaining outer light component of the angular range θ2 up to the boundary surface 7c so as to make the remaining outer light component reach the boundary surface 7c with an incident angle exceeding the critical angle of the prism 7a. The remaining outer light component is reflected on the boundary surface 7c so as not to reach the polarizing plate 3a of the display device 3.

On the contrary, the image light of the inverted display image emitted from the display device 3 can be transmitted in the prisms 7a, 7b of the optical path changing member 7 and reaches the longitudinal-central portion of the combiner 5, which portion is visible from the eye point I through the interval of the two analog meter units 9.

In the vehicle-applied display unit of the present embodiment, a polarizing plate 7d (second polarizing plate) having a polarization direction of the vehicle-height direction differently from the polarization direction of the polarizing plate 5b of the combiner 5 is coated on the surface of the optical path changing member 7 facing the opening 1c of the dashboard 1 as shown in FIG. 6 and FIG. 7.

When the inverted display images such as auxiliary information, is displayed on the display device 3, the image light of the inverted display image enters the optical path changing member 7 from its bottom surface, is transmitted therein, and is emitted from the top surface of the optical path changing member 7 facing the opening 1c of the dashboard 1 toward the longitudinal-central portion of the combiner 5.

The inverted display image displayed on the display device 3 is firstly polarized in the vehicle-width direction by passing through the polarizing plate 3a and subsequently receives the distortional action of changing the oblong rectangular form shown in FIG. 4 to the sector shown in FIG. 8. The image light of the inverted display image is emitted toward the opening 1c of the dashboard 1 from the optical path changing member 7, while passing through the polarizing plate 7d coated on the optical path changing member 7. The polarization direction of the polarizing plate 7d agrees with that of the polarizing plate 3a.

The inverted display image, which has been polarized by the polarizing plate 3a in the vehicle-width direction, has received the distortional action from the optical path changing member 7, and has been irradiated to the longitudinal-central portion of the combiner 5, can not pass through the polarizing plate 5b coated on the inner surface of the combiner 5 because the polarization direction (the vehicle-height direction) of the polarizing plate 5b is different from that (the vehicle-width direction) of the polarizing plate 7d. Therefore, the entire inverted display image is reflected toward the eye point I by the inner surface of the combiner 5.

When the inverted display image is reflected toward the eye point I at the inner surface near the longitudinal-central portion of this the combiner 5, the inverted display image having received the distortional action like that shown in FIG. 8 from the optical path changing member 7 is front-and-back and top-and-bottom inverted to the normal image and receives the distortional action changing the oblong rectangular form like that shown in FIG. 4 to the sector shown in FIG. 5 from the combiner 5.

Figure 9:
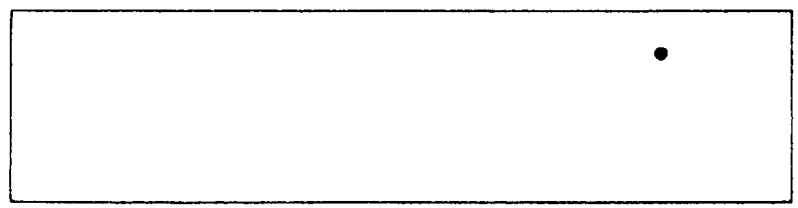
FIG. 9 is an explanatory illustration showing an example of a normal image visible from an eye point as a result of the offset of distortional action of the optical path changing member and the combiner of FIG. 1.

Accordingly, when the image obtained by inverting front-and-back and top-and-bottom the sector shown in FIG. 8 receives the distortional action changing the oblong rectangular from like shown in FIG. 4 to the sector shown in FIG. 5 from the combiner 5, a vehicle-longitudinal direction component of the distortional action received from the optical path changing member 7 is offset by the vehicle-height direction component of the distortional action received from the combiner 5. As a result, the normal image obtained by front-and-back and top-and-bottom inverting the inverted display image displayed on the display device 3 becomes a form enlarged only in the vehicle-width direction relative to the inverted display image and is visible as the virtual image S shown in FIG. 9 from the eye point I.

On the other hand, the outer light component; of the outer light entering from the vehicle-outside to the vehicle-inside, going toward the optical path changing member 7 through the opening 1c of the dashboard 1 has the outer light component (with the angular range θ1 of FIG. 1) passing through the combiner 5 and the outer light component (with the angular range θ2 of FIG. 1) not passing the combiner 5.

The outer light component of the angular range θ1 is polarized by the polarizing plate 5b in the vehicle-height direction upon passing the combiner 5 and reaches the polarizing plate 7d of the optical path changing member 7 through the opening 1c of the dashboard 1, but cannot pass through the polarizing plate 7d. That is, the outer light component of the angular range θ1 is intercepted by the polarizing plate 7d because the polarizing plate 7d has a polarization direction different from that of the polarizing plate 5b. Thus, the outer light component of the angular range θ1 does not reach the display device 3.

On the contrary, the outer light component of the angular range θ2 reaches the polarizing plate 7d of the optical path changing member 7 without the polarization of the polarizing plate 5b and enters the prism 7a of the optical path changing member 7 after polarized by the polarizing plate 7d in the vehicle-width direction. However, because the outer light component of the angular range θ2 reaches the boundary surface 7c with the angle exceeding the critical angle of the prism 7a, the outer light component of the angular range θ2 is reflected on the boundary surface 7c. Thus, the outer light component of the angular range θ2 also does not reach the display device 3.

As discussed above, the outer light from the vehicle-outside cannot be irradiated to the display device 3, and therefore the inverted display image luminously-displayed on the display device 3 is not washed out nor weakened.

The combiner 5 itself is formed of smoke-processed dark-colored resin so that the attenuation of transmitted light is carried out by the combiner 5 itself, whereby the irradiation of the outer light to the display device 3 is prevented.

Further, the combiner 5 stands on or inside the recess 1b of the dashboard 1 generally concentrically with the inner surface of the recess 1b and the inner surface of the recess 1b is arranged behind the combiner 5 visible from the eye point I so that the combiner 5 can be visible in almost the same color as that of the dashboard 1. As a result, the contrast between the inverted display image portion on the inner surface of the combiner 5 and the other portion on the inner surface of the combiner 5 is not lowered by the outer light irradiation from the back side (the vehicle front side) of the combiner 5, so that the visibility of the virtual image S of the normal image is not lowered.

That is, in the vehicle-applied display unit of the present embodiment, the washout on the display device 3 and the washout on the combiner 5 are prevented.

In the vehicle-applied display unit of the present embodiment, the visual field of the virtual image S of the normal image on the combiner 5 is arranged between the two analog meter units 9, and the real image of the analog meter units 9 and the virtual image S are enclosed with the top edge 5a of the combiner 5 so that the analog meter units 9 and the virtual image S are visible like a single combined meter unit.

Besides, the combiner 5 stands on or inside the recess 1b of the top face 1a of the dashboard 1, so that the forward outside sight from the eye point I is not obstructed by the combiner 5, even if the combiner 5 is not transparent, by adjusting the height of the combiner 5 and the depth of the recess 1b.

Further, in the visual field from the eye point I, the top edge 5a of the combiner 5 is hidden by the steering wheel 11 so that the top edge 5a of the combiner 5 is invisible from the eye point I, thereby obtaining a preferable sight.

In the vehicle-applied display unit of the present embodiment, the visual field of the virtual image S of the normal image of the combiner 5 is arranged between the analog meter units 9. Therefore, compared to an arrangement wherein the visual field of the virtual image S is arranged over or under the analog meter units 9, the depth of the recess 1b of the dashboard 1 can be smaller, and the height of the combiner 5 can be smaller. Therefore, the combiner 5 can be arranged outside the forward sight of the vehicle, which secures the wider forward sight of the vehicle especially in the vehicle-height direction.

The light attenuation process or method to the combiner 5 may be one of the smoke-treatment and the polarizing plate. The prevention of the outer light onto the display device 3 may be carry out only by the polarizing plate 7d by not utilizing the total reflection on the boundary surface 7c of the optical path changing member 7 with use of the critical angle in accordance with the angular range of the outer light passing through the combiner.

If the attenuation or the interception of the outer light for preventing the washout of the display on the display device 3 can be achieved only by the combiner 5, the polarizing plates 5b, 7d may be eliminated.

Further, the combiner 5 may not be curved in the regular-arcuated form in the vehicle-width direction. That is, the distortional action of the image by the optical path changing member 7 may be modified or omitted in accordance with the area of the inverted display image on the combiner 5.

The display device 3 is not limited to the liquid crystal display with the back light, in which liquid crystal display the image light of the display image receives the polarization action. For example, the display device 3 may be a luminescent device such as FE (field emission) display, fluorescent indicator tube, or EL (electroluminescence) display.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A vehicle-applied display unit for a vehicle having a windshield, comprising:

a dashboard positioned below said windshield and ahead of an eye point in the vehicle;

a luminous display source provided inside the dashboard;

an opening provided on the dashboard; and a combiner standing on the dashboard visibly from the eye point and reflecting image light, toward the eye point, of a display image emitted from the luminous display source and passed the opening, wherein the combiner is arranged on an optical path of a portion of outer light entering a vehicle-inside from a vehicle-outside, going toward the luminous display source through the opening, at least over a whole extent, in a vehicle-width direction, of the portion of the outer light for at least partially enclosing the opening over a front through both sides portions thereof and is made of light-attenuation processed material capable of at least attenuating the portion of the outer light, wherein a recess is formed on a top face of the dashboard, and wherein the combiner stands-inside is arranged within the recess and below said windshield while partially enclosing the opening formed in the recess so that the combiner is positioned outside a vehicle forward sight from the eye point.

2. The vehicle-applied display unit as set forth in claim 1, wherein the combiner is arcuately formed in a vehicle-width direction with an inside surface of the combiner facing the eye point in such a manner that both longitudinal ends of at least a portion, of the combiner, on which the image light of the display image is irradiated are positioned rearward of a central portion thereof and also in such a manner that, in a vehicle-height direction, the portion of the combiner has a straight cross-section while inclinedly standing rearward with a top thereof being positioned rearward of a bottom thereof.

3. The vehicle-applied display unit as set forth in claim 1, wherein
- a measuring instrument displaying a state of the vehicle is arranged on a portion of the dashboard, located nearer the eye point than the opening is, and
- the combiner has such an external form that a contour of the combiner visible from the eye point almost encloses a virtual image of the display image and a real image of the measuring instrument, the virtual image being obtained by irradiation of the image light of the display image and being visible from the eye point.

4. The vehicle-applied display unit as set forth in claim 3, wherein
- the measuring instrument includes a plurality of meter units with intervals in the vehicle-width direction and
- the combiner is arranged in a manner that a portion of the combiner reflects the image light of the display image of the luminous display source toward the eye point, the portion being positioned between two meter units adjacent to each other.

5. The vehicle-applied display unit as set forth in claim 1, wherein
- a steering wheel is arranged between the dashboard and the eye point, and
- the combiner has a regular-arcuated top edge, a curvature of the top edge being different from that of the steering wheel according to a back-and-forth position difference therebetween from the eye point.

6. The vehicle-applied display unit as set forth in claim 1, wherein
- an optical path changing member to make the optical path of some area, in a vehicle-height direction, of the portion of the outer light go away from the luminous display source is arranged between the luminous display source and the combiner, and
- the combiner is arranged on the optical path of at least a remaining area of the portion of the outer light.

7. The vehicle-applied display unit as set forth in any one of claim 1–4 or 5–6,
wherein a polarizing plate is arranged on one surface of the combiner for attaining light attenuation, and
wherein a second polarizing plate having a polarization direction different from that of the polarizing plate by 90 degrees is arranged between the opening and the luminous display sources.

8. The vehicle-applied display unit as set forth in claim 7, wherein
the luminous display source has a third polarizing plate having a same polarization direction as that of the second polarizing plate on an emitting surface of the image light of the display image.

9. A vehicle-applied display unit for a vehicle having a windshield, comprising:
- a dashboard positioned below said windshield and ahead of an eye point in the vehicle;
- a luminous display source provided inside the dashboard;
- an opening provided on the dashboard; and
- a combiner standing on the dashboard visibly from the eye point and reflecting image light, toward the eye point, of a display image emitted from the luminous display source and passed the opening,
wherein a recess is formed on a top face of the dashboard, and
wherein the combiner is arranged within the recess, below said windshield, and ahead of the opening formed in the recess so that the combiner is positioned outside a vehicle forward sight from the eye point.

10. The vehicle-applied display unit as set forth in claim 9, wherein
- a measuring instrument displaying a state of the vehicle is arranged on a portion, of the dashboard, located nearer the eye point than the opening is, and
- the combiner has such an external form that a contour of the combiner visible from the eye point almost encloses a virtual image of the display image and a real image of the measuring instrument, the virtual image being obtained by irradiation of the image light of the display image and being visible from the eye point.

11. The vehicle-applied display unit as set forth in claim 10, wherein
- the measuring instrument includes a plurality of meter units with intervals in the vehicle-width direction and
- the combiner is arranged in a manner that a portion of the combiner reflects the image light of the display image of the luminous display source toward the eye point, the portion being positioned between two meter units adjacent to each other.

12. The vehicle-applied display unit as set forth in any one of claims 10–11, wherein
- a steering wheel is arranged between the dashboard and the eye point, and
- the combiner has a regular-arcuated top edge, a curvature of the top edge being different from that of the steering wheel according to a back-and-forth position difference therebetween from the eye point.

* * * * *